United States Patent [19]

Kopetzky et al.

[11] Patent Number: 4,562,308
[45] Date of Patent: Dec. 31, 1985

[54] SUBSCRIBER CONNECTION CIRCUIT COMPRISING FEED RESISTORS WHICH CAN BE BRIDGED IN LOW-OHMIC FASHION AND AN INDICATION CIRCUIT WHICH EFFECTS DIFFERENT INDICATIONS

[75] Inventors: Horst Kopetzky, Unterhaching; Werner Nagler, Munich; Walter Ossler, Germering, all of Fed. Rep. of Germany

[73] Assignee: Siemens Aktiengesellschaft, Berlin & Munich, Fed. Rep. of Germany

[21] Appl. No.: 465,118

[22] Filed: Feb. 9, 1983

[30] Foreign Application Priority Data

Mar. 1, 1982 [DE] Fed. Rep. of Germany ....... 3207318

[51] Int. Cl.⁴ .......................... H04Q 3/00; H04M 3/22
[52] U.S. Cl. ........................... 179/18 FA; 179/18 HB; 179/84 R
[58] Field of Search ........ 179/16 AA, 18 FA, 18 FF, 179/18 FG, 18 HB, 70, 77, 84 R, 84 A

[56] References Cited

U.S. PATENT DOCUMENTS

| | | | |
|---|---|---|---|
| 4,301,334 | 11/1981 | Lechner | 179/16 AA |
| 4,320,260 | 3/1982 | Lechner | 179/18 FA |
| 4,336,424 | 6/1982 | Lechner | 179/18 FG |
| 4,396,805 | 8/1983 | Wagner | 179/18 FA |
| 4,443,669 | 4/1984 | Kopetzky | 179/175.2 C |
| 4,446,338 | 5/1984 | Rosch | 179/18 FA |

FOREIGN PATENT DOCUMENTS 2939009  9/1979  Fed. Rep. of Germany ........ 179/18 FA Primary Examiner—Gene Z. Rubinson
Assistant Examiner—Elio DiVito
Attorney, Agent, or Firm—Hill, Van Santen, Steadman & Simpson

[57] ABSTRACT

A subscriber connection circuit comprises heat resistors which can be bridged in a low-ohmic manner and an indication circuit which effects different indication functions. Four different operating states are possible, characterized by the nature of the feed, the switching threshold for the indication circuit, and the actuation of a filter element for the indication circuit, two of which operating modes represent the ringing phase and the ringing interval. During the ringing interval, the nature of the feed and the threshold voltage are identical to those in the conversation operating state, but in contrast thereto the filter element is actuated.

4 Claims, 1 Drawing Figure

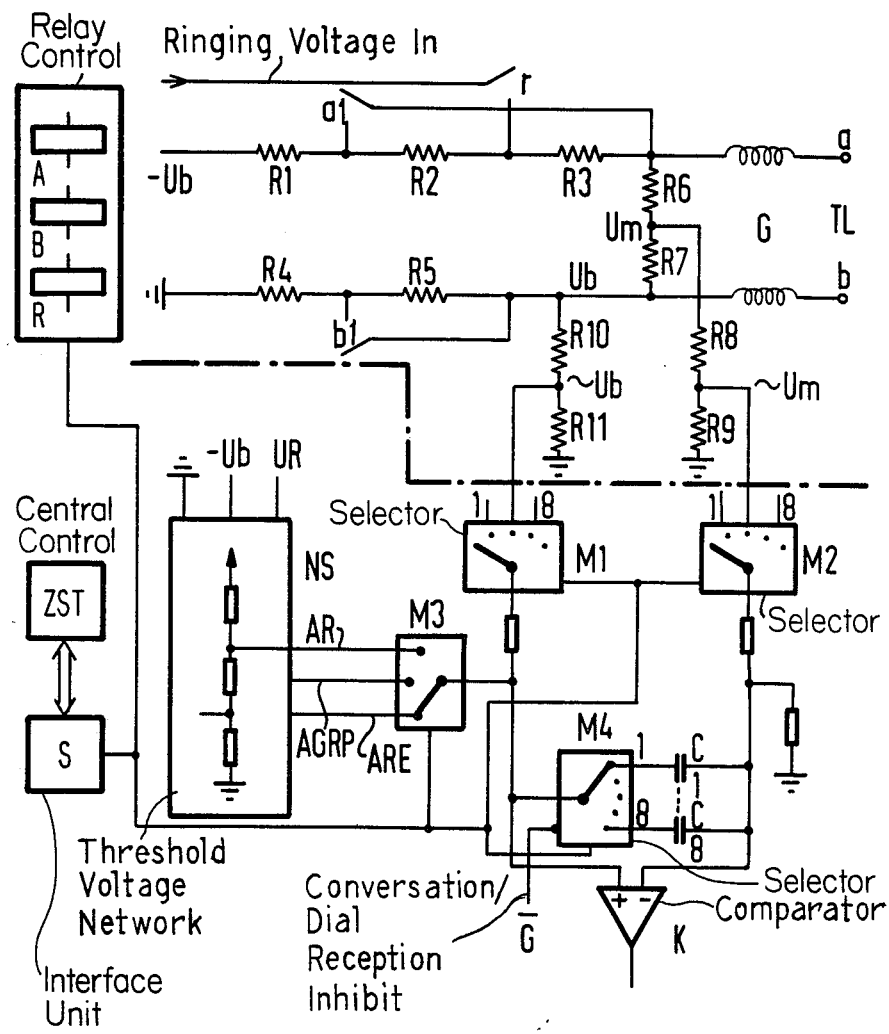

SUBSCRIBER CONNECTION CIRCUIT COMPRISING FEED RESISTORS WHICH CAN BE BRIDGED IN LOW-OHMIC FASHION AND AN INDICATION CIRCUIT WHICH EFFECTS DIFFERENT INDICATIONS

BACKGROUND OF THE INVENTION

1. Field of the Invention

The present invention relates to a subscriber connection circuit for disconnecting, at the exchange end, a subscriber connection line having feed resistors which can be bridged in low-ohmic fashion and by way of which the line conductors of the subscriber connection line are connected, either in high-ohmic fashion or low-ohmic fashion, depending upon the operating state, to one of the two poles of the feed voltage source. The circuit also comprises an indication circuit which effects a plurality of different indication function as a result of the evaluation of the potential state prevailing at line-wire related fixed coupling points, and wherein, accordingly, different response switching thresholds are implemented, which moreover is connected at its output to a filter element in the event of the execution of specific indication functions, and which is preferably used for the control of a plurality of subscriber connection circuits.

2. Description of the Prior Art

In a subscriber connection circuit of the type mentioned above (German published application 29 39 009, fully incorporated herein by this reference) it is possible to ensure that the feed current source of the telephone exchange which services a plurality of subscriber connection circuits is not subject to overload, since the maximum feed current is not received in all operating states. In the subscriber connection circuit, in the rest state highly-ohmic resistors are contained in the feed circuit in which case the feed current which then flows is sufficient to facilitate an excitment indication. In the conversation state and in the rest phase these highly-ohmic feed resistors are bridged, at least when the resistor is located in the one line wire of the subscriber connection line, enabling the flow of a full feed current, or at least a higher feed current, then in the rest state.

In this subscriber connection line it is also possible to prevent an overlong actuation of the ground key in the subscriber apparatus, leading to overloading of the switching elements contained in the feed circuit, as in such a case switch-over must again be effected from the low-ohmic feed to the highly-ohmic feed.

In the aforementioned known circuit arrangement, the individual indication functions, therefore, for example, the excitation indication, the indication of a loop closure due to a call and, in the case of dailing, can be carried out regardless of the different feed conditions which prevail during different operating states and regardless of the different requirements on the analysis feed, using a single indication circuit, in the corresponding different response switching thresholds are, in each case, implemented in this indication circuit. A filter element which is connected at the output, in the event of specific indication functions of the indication circuit, serves to increase analysis reliability.

In particular in the case of the indication of the loop closure as a result of a call, it is important that the indication result should be availiable as quickly as possible following the instant of the loop closure since, for example, when the subscriber loop is closed the carbon microphone of the subscriber apparatus is traversed by the feed current which is superimposed upon the ringing alternating current, so that the danger of overload exists and, accordingly, the call must be disconnected as directly as possible following the loop closure.

This means that it is advisable to recognize, as soon as possible, even those loop closures which occur during a ringing interval in order to be able to introduce the necessary switching measures.

In the aforementioned circuit arrangement, the ringing phase and the ringing interval are treated as one and the same operating mode as regards the switching technology, which differ control-wise merely in that in the ringing phase the ringing relay by way of which the ringing voltage is connected has pulled up, whereas in the ringing interval it has dropped. Therefore, there is no switch-over of the switching element by way of which the threshold voltages are connected to the indication circuit during the various operating states. Since in the operating state ringing phase/ringing interval the feed voltage is supplied via a voltage divider which, during the ringing phase, is connected to the feed voltage superimposed by the ringing alternating voltage, but in the ringing interval is connected solely to the feed voltage, and appropriate threshold value occurs during the ringing interval and prevents the response of the indication circuit. It has already been proposed that the same conditions be set up during the ringing interval as in the "conversation/dial reception" operating state during which the filter element is not actuated. However, this can lead to the erroneous response of the indication circuit in the event of a change from the ringing phase to the ringing interval because of interference pulses and compensation processes on the line.

SUMMARY OF THE INVENTION

The object of the present invention is to increase the analysis reliability during ringing operation in a circuit arrangement of the type generally set forth above.

The above object is achieved, according to the present invention, in that a circuit arrangement of this kind is capable of assuming four different modes of switching operation which are characterized by the nature of the feed, the response threshold of the indication circuit, the occurrence of the ringing alternating voltage, and the actuation of the filter element. The ringing phase and the ringing interval represent two separate operating modes, the operating mode of the ringing interval being identical in terms of the feed and response threshold of the indication circuit to the operating mode of conversation and dial reception, yet in contrast to the latter is effective with the filter element actuated.

On the basis of the theory in accordance with the invention, during the ringing phase the indication circuit is governed by a threshold value which corresponds to the occurrence of the sum current of ringing alternating current and feed direct current in the event of a loop closure. The filter capacitor is actuated in order to avoid erroneous analysis but during the ringing interval the same threshold value prevails as during the operating state of conversation/dial reception, although in contrast to this operating state, the filter capacitor is, in fact, actuated, which in the lastmentioned operating state of conversation/dial reception would lead to an adulteration of the dialed characteristics. As a result, even during the ringing interval, it is possible to recognize the occurrence of a loop closure, thus ensuring that non-operating currents, which occur as a result of charges remaining of the subscriber connection line following the transition from the ringing phase to the ringing interval, cannot erroneously lead to the display of a loop closure.

BRIEF DESCRIPTION OF THE DRAWING

Other objects, features and advantages of the invention, its organization, construction and operation will be best understood from the following detailed description, taken in conjunction with the accompanying drawing, on which there is a single figure which is a schematic representation of an exemplary embodiment of a subscriber connection circuit suitable for practicing the present invention and shown in a scope necessary for an understanding of the invention.

DESCRIPTION OF THE PREFERRED EMBODIMENTS

Referring to the drawings, the section thereof arranged above the dash-dotted line basically represents those components of the subscriber connection circuit which relate to the feed process. These components include a plurality of feed resistors R1–R5, of which the feed resistors R1–R3 are located between the first pole of a feed battery (−Ub) and the a wire of a subscriber connection line TL which is terminated by the subscriber connection circuit. The resistors R1 and R3 are low-ohmic resistors, whereas the resistor R2 is a highly-ohmic resistor. A low-ohmic resistor R4 and a highly-ohmic resistor R5 are located between the other pole (ground) of the feed voltage source and the b wire terminal of the subscriber connection line TL.

The resistors R2 and R3, on the one hand, and the resistor R5, on the other hand, can be bridged in a low-ohmic fashion by the actuation of a pair of contacts a1 and b1 of respective relays A and B.

The drawing also illustrates a contact r of a relay R by way of which the ringing alternating voltage supplied by a ringing voltage source (not shown) can be fed in between the resistors R2 and R3.

The relays A, B and R are actuated by a symbolically-indicated relay control which contains these relays and which communicates by way of an interface unit S with a central control device ZST.

The upper portion of the drawing also represents the two-wire end components of the hybrid circuit G for a two-wire/four-wire junction.

A reference point for the evaluation of the potential changes on the wires of the subscriber connection line which characterize the individual operating states will be considered, on the one hand, as the connection point of the two resistors R6 and R7 which form a highly-ohmic cross branch between the line wires, and, on the other hand, as the terminal, facing away from the first pole (ground potential) of the feed voltage source, of the feed resistor R5 which is connected to the b wire. The potentials which occur at these coupling points Um and Ub are forwarded via voltage dividers formed by a plurality of resistors R8, R9 and R10, R11 to that part of the subscriber connection circuit which serves to effect analysis and which is represented below the dash-dotted line.

The actual analysis circuit is formed by a comparator K which serves to carry out all the indication functions and also services a plurality, for example eight, subscriber connection circuits.

The potentials appearing at the coupling points Um and Ub are reported by way of the interface S to the central control ZST which is therefore in the position of supplying corresponding selection instructions to the relay control in accordance with the respective operating state.

The forwarding of the potentials at the coupling points Um and Ub is effected accordingly via a pair of selectors M1 and M2 by way of which connections are selectively established between the divider points of the voltage dividers R8/R9 and R10/R11 of one of the subscriber connection circuits being serviced and the inverting input of the comparator K. The evaluation portion of the illustrated subscriber circuit contains a network NS by which different threshold voltages are generated for the analysis circuit K, dependent upon which function is to be executed. In accordance with the required threshold voltages, the network NS comprises three voltage dividers, one of which is shown. The voltage dividers supply, respectively, one of the threshold voltages AR, AGRP and ARE of which, respectively, one is switched on with the assistance of a selector M3, and is applied to the non-inverting input of the comparator K which forms the analysis circuit. The control of the selector M3 likewise occurs from the central control ZST in that appropriate selection addresses are supplied to the address inputs of the selector 3.

The circuit arrangement further comprises a selector M4 with the aid of which one of the capacitors C1–C8 can be selectively connected in parallel to the inputs of the comparator K, depending upon which subscriber connection circuit the comparator is currently servicing. The capacitors form filter elements of low-pass characteristics which prevent erroneous indications on the part of the comparator K. The input G of the selector M4 is to characterize the fact that in the operating state of conversation/dial reception the selector is not conductive and therefore no filter element is operative.

In the following, the mode of operation of the illustrated circuit arrangement, according to the present invention, will be discussed in detail.

It has already been shown that this circuit arrangement can assume four different modes of switching operation characterized by the form of feed, the response threshold of the indication circuit, the occurrence of the ringing alternating voltage and the actuation of the filter element.

In the "rest" operating mode, none of the relays A, B or R is excited which means that highly-ohmic feed prevails and no ringing alternating voltage is supplied. By way of the selector M3, the output AR of the switching threshold network NS is connected to the non-inverting input of the comparator K so that a threshold which governs the excitation indication function prevails. Furthermore, the capacitor in question amongst the capacitors C1–C8 is actuated, that is connected across the inputs of the comparator K.

In the operating state "conversation/dial reception" the two relays A and B are excited so that the highly-ohmic components of the feed resistors are shunted, and thus low-ohmic feed prevails and the relay R is not excited. By way of the selector M3, the output AGRP of the switching threshold network NS is now connected to the non-inverting input of the comparator K so that the analysis circuit operates as a loop indication circuit. In this case, the selector M4 is blocked with the result that during this operating state a filter element is inactive, thus preventing the dialed characteristics from becoming distorted.

In the operating state "ringing state" the relays B and R are excited. This means that a higher feed current flows than in the "rest" operating state and that the ringing alternating current fed in via the contact r of the relay R is fed in low-ohmic fashion to the subscriber connection line, but at the same time substantial components thereof are prevented from being discharged via the feed battery. By way of the selector M3, the ouput ARE is now connected to the first comparator input so that a corresponding connection threshold of the analysis circuit now prevails, adapted to the conditions of loop closure during the ringing phase. In this operating state the corresponding filter element is actuated.

In the fourth mode of switching operation "ringing interval" which differs as stated from the "ringing phase" operating mode, the excitation state of the relays A, B and R is the same as in the "conversation" operating state and thus low-ohmic feed prevails. In contrast to the "ringing phase" operating state, the output AGRP is connected to the first comparator input and therefore the same response threshold prevails as in the "conversation/dial reception" operating state. In contrast to the last-mentioned operating state, however, now the filter element in question is actuated. This ensures that even in the "ringing interval" operating state a loop closure is recognized and erroneous indications are avoided to as great an extent as possible.

Each of the four operating states is characterized by a control word which comprises two bits, is produced by the central control, and is fed to a decoder logic which appropriately influences the relays A, B, R and the selectors M3 and M4.

Although we have described our invention by reference to particular illustrative embodiments thereof, many changes and modifications of the invention may become apparent to those skilled in the art without departing from the spirit and scope of the invention. We therefore intend to include within the patent warranted hereon all such changes and modifications as may reasonably and properly be included within the scope of our contribution to the art.

We claim:

1. A subscriber connection circuit arrangement for connection between a two-wire subscriber line and an exchange battery and operable to indicate the current operating mode of the subscriber line, said subscriber connection circuit arrangement comprising:
   a feed resistor network including
     a plurality of first resistors serially connected between a pole of the exchange battery and a first wire of the subscriber line,
     a plurality of second resistors serially connected between a reference potential pole of the exchange battery and a second wire of the subscriber line,
     a plurality of third resistors connected in series and and connected across the respective connections of said first and second resistors to the first and second wires of the subscriber line,
     a first voltage divider connected between a pair of said third resistors and the reference potential and including an output, and
     a second voltage divider connected between the connection of said third resistors to the second wire of the subscriber line and the reference potential and including an output; and
   an analysis circuit including
     a plurality of selectively operable relay contacts to define operating modes, including a first contact operable to shunt some of said first resistors, a second contact operable to shunt at least one of said second resistors and a third contact operable to connect a source of alternating ringing voltage to a point between the pair of said first resistors,
     a rest operating mode defined by closure of none of the relay contacts providing a low feed current,
     a conversation/dial reception operating mode defined by the closure of said first and second contacts providing a high feed current,
     a ringing phase operating mode defined by closure of said second and third contacts providing a ringing current superimposed on an intermediate feed current; and
     a ringing interval operating mode defined by closure of said first and second contacts providing a high feed current;
     a comparator including a pair of inputs connected to respective outputs of said first and second voltage dividers, and an output for providing signals representing the current operating mode,
     filter means connected across said inputs and selectively operable to provide predetermined filter characteristics in said rest, ringing phase and ringing interval operating modes, and
     threshold value means connected to one of said inputs of said comparator and operable to selectively provide predetermined threshold signals to said comparator.

2. The subscriber connection circuit arrangement of claim 1, wherein said threshold value means comprises:
   signal generator means operable to produce said predetermined threshold signals; and
   a selector connected between said signal generator means and said one input of said comparator and operable to selectively connect said signals to said comparator.

3. The subscriber connection circuit arrangement of claim 1, wherein said filter means comprises:
   a plurality of capacitors connected to one input of said comparator; and
   a selector connected between said capacitors and the other input of said comparator and operable to selectively connect said capacitors across said inputs of said comparator.

4. A subscriber connection circuit arrangement, for a plurality of subscriber lines, according to claim 1, comprising:
   a plurality of said feed resistor networks connected between the exchange battery and respective subscriber lines and including respective voltage divider outputs; and
   first and second selectors connected to respective inputs of said comparator, said first selector connected to said outputs of said first voltage dividers, said second selector connected to said outputs of said second voltage dividers, and said selectors operable to selectively connect said resistor networks to said comparator.

* * * * *